3,248,450
PREPARATION OF CATALYSTS AND TO AN ISOMERISATION PROCESS IN WHICH SAID CATALYSTS ARE EMPLOYED
Anthony George Goble, Sunbury-on-Thames, Middlesex, England, assignor to The British Petroleum Company Limited, London, England, a British joint-stock corporation
No Drawing. Filed Nov. 20, 1962, Ser. No. 239,048
Claims priority, application Great Britain, Nov. 29, 1961, 42,652/61, 42,655/61
13 Claims. (Cl. 260—683.2)

This invention relates to the preparation of catalysts suitable for hydrocarbon conversion reactions, for example, for moving the position of the double bond in olefin hydrocarbons, and to their use for carrying out hydrocarbon conversion processes.

Catalysts containing a hydrogenating metal, alumina and halogen are known and have been proposed for use in a number of reactions. The form in which the halogen is present influences the activity of the catalyst.

It is an object of the invention to provide a method for the production of a novel catalyst. It is a further object to provide a catalyst suitable for effecting migration of an olefinic double bond and which when employed in this reaction is selective for this reaction only and which has substantially no skeletal isomerisation activity or polymerisation activity. It is a further object to provide an improved isomerisation process.

According to one aspect of the present invention, there is provided a method of preparing a catalyst, suitable for hydrocarbon conversion reactions, which comprises the step of contacting a halogenatable inorganic oxide with an alkali metal compound or alkaline earth metal compound so that alkali metal or alkaline earth metal is retained by the oxide and, either before or after said step, contacting the oxide with a chlorine-containing compound so that chlorine is also retained by the oxide.

If desired the catalyst may contain other components in addition to the inorganic oxide, alkali metal or alkaline earth metal, and chlorine, these components being preferably added before the chlorination and preferably also before the addition of the alkali metal or alkaline earth metal. For example the catalyst may contain a minor proportion, preferably less than 25% wt., of a metal or metal compound having hydrogenating activity selected from Group VIa or VIII of the Periodic Table. The preferred metal is a platinum group metal which may be present in an amount from 0.01 to 5% wt. and preferably 0.1 to 2% wt. The preferred platinum group metals are platinum and palladium.

A wide variety of chlorine-containing compounds have been proposed for use in the preparation of chlorine-containing catalysts and the presence of chlorine in any form will normally confer some activity on a catalyst. The present invention therefore includes the use of any suitable chlorine-containing compounds. However, it has recently been found that certain chlorine-containing compounds confer particular forms of activity (for example low temperature isomerisation activity) not conferred by other chlorine-containing compounds. Preferably, therefore, the chlorine-containing compounds have the general formula $>CCl_2$ and more particularly:

(where X and Y are the same or different and are selected from H, Cl, Br, F or SCl, or where X and Y together are O or S), the compound being used under non-reducing conditions and at a temperature such that chlorine is taken up by the oxide without the production of free chloride.

The inorganic oxide besides being halogenatable under the conditions specified above should also clearly have the desired physical characteristics to render it suitable as a hydrocarbon conversion catalyst. It is preferably a refractory oxide selected from Groups III to V of the Periodic Table, for example alumina, boria, silica, titania, or zirconia. The preferred refractory oxide is alumina. Mixtures of two or more inorganic oxides may be used if desired.

Preferably the alkali metal or alkaline earth metal is added to the inorganic oxide before the chlorine. By adding the components in this order catalyst preparation and the control of the amounts of the components added is facilitated. Some chlorine-containing catalysts are susceptible to hydrolysis in the presence of water. By making the chlorination the last stage in the preparation, the catalyst preparation can be completed in situ in a reactor, thereby eliminating the need for storing and transporting water-sensitive catalysts. The fact that the reactable groups of the inorganic oxide are reacted first with the alkali metal compound or alkaline earth metal compound also facilitates the control of the chlorination which, as will be indicated later, is more critical than the control of the addition of the alkali metal compound or alkaline earth metal compound. Thus the catalyst activity and selectivity for certain reactions depends upon the relative amounts of alkali metal or alkaline earth metal and chlorine present. Good control over the amounts added is, therefore, necessary and the order of addition of the components used in the present invention is particularly suitable for exercising good control.

Preferably the alkali metal compound or alkaline earth metal compound which is used in the formation of the catalyst is an ionic compound. Preferably this compound is a compound which is capable of providing metal cations under the conditions under which it is brought into contact with the inorganic oxide or under conditions employed subsequently but prior to chlorination of the catalyst.

The precise way in which the addition of an alkali metal or alkaline earth metal arts to alter the activity of the catalyst is not known for certain but it is believed that the metal cation combines in some way with the inorganic oxide, possibly at reactive sites present on the surface of the oxide. Preferably therefore the oxide is treated after the contacting to dissociate the alkali metal or alkaline earth metal compound, for example for calcination, and the compound used is preferably one which can be dissociated without leaving other elements on the oxide. Particularly suitable compounds are carbonates, bicarbonates and the salts of organic acids, particularly carboxylic acid, for example formates, acetates and oxalates. The compounds may conveniently be added initially to the inorganic oxide by impregnation using a solution of the compound.

Preferred alkali metals are potassium and sodium, particularly the former.

The amount of alkali metal or alkaline earth metal retained may be small in relation to the amount of inorganic oxide, for example in the range 0.01–10% by weight of inorganic oxide. The minimum amount necessary in any given application to render the catalyst selective may be determined by experiment. Metal present in excess of the minimum amount is not deleterious and it has been found that appreciable amounts of chlorine can be taken up by oxide containing 4–5% by wt. of alkali metal. Preferably, the amount of metal is at least 1% wt., and more particularly at least 2% wt. However, as indicated later, the reaction of the alkali metal or alkaline earth metal and the chlorine with the inorganic oxide is considered to be a surface phenomenon. When considering the desirable amount of the components for any given oxide, the surface area of the oxide should also be taken into account, higher surface area oxides requiring proportionately greater amounts of the components than lower surface area oxides.

Suitable chlorine-containing compounds are

Carbon tetrachloride ($CCl_4$)
Chloroform ($CHCl_3$)
Methylene chloride ($CH_2Cl_2$)
Dichlorodifluoromethane ($CCl_2F_2$)
Trichlorobromomethane ($CCl_3Br$)
Thiocarbonyltetrachloride ($CCl_3SCl$)
Phosgene ($COCl_2$)
Thiophosgene ($CSCl_2$)

The first three compounds listed are preferred. In the case of compounds containing elements other than chlorine, carbon and hydrogen, the treatment may add the other elements to the catalyst in addition to the chlorine. For example treatment with dichlorodifluoromethane results in the uptake of both chlorine and fluorine onto the catalyst. The presence of these other elements does not affect the activity conferred by the chlorine, but it may confer other properties and care should, therefore, be exercised to ensure that the selectivity of the catalyst is not affected.

Since according to a preferred feature of the invention the main chlorination reaction takes place after the addition of the alkali metal or alkaline earth metal, it follows that the inorganic oxide used should not contain large amounts of halogen. However it has been found that small amounts (for example up to 1% wt.) of halogen can be initially present in the inorganic oxide without adversely affecting the subsequent treatments. Thus the inorganic oxide subjects to the process of the present invention may be a platinum-alumina catalyst containing up to 1% wt. of halogen such as is normally used for the reforming of gasoline boiling range hydrocarbons.

The characteristic of an inorganic oxide which renders it halogenatable under the conditions specified without the formation of free chloride is believed to be the original presence of hydrogen. Alumina is the preferred inorganic oxide and it is a characteristic of activated alumina normally used for hydrocarbon conversion catalysts that, although predominantly alumina, they do contain a small amount of hydrogen, usually less than 1% wt. This hydrogen is generally considered to be in the form of surface hydroxyl groups, which form acid or potentially acid sites. Since the chlorination is essentially a surface phenomenon the amount of chlorine which can be added without the formation of free chlorine is related to the surface area, the greater the surface area, the greater the amount of fluorine which can be added. However, the earlier treatment with the alkali metal compound or alkaline earth metal compound will have caused some modification of the reactive surface group and the amount of chlorine that can be added will be controlled by this earlier treatment and will be less than the amount which could have been added if the catalyst had not been treated with an alkali metal compound or alkaline earth metal compound. Having regard to the surface areas which suitable inorganic oxides normally have the chlorine content will usually be at least 1% by weight, and it may be up to 15% wt.

Any of the forms of alumina suitable as a base for reforming catalysts may be used, but a particularly preferred form is one derived from an alumina hydrate precursor in which the trihydrate predominates. One containing a major proportion of β-alumina trihydrate is particularly suitable. A convenient method of preparing the alumina is by hydrolysis of an aluminium alcoholate, for example aluminum isopropoxide, in an inert hydrocarbon solvent, for example benzene. Other things being equal, the greater the amount of chlorine taken up by the alumina, the greater is the activity of the catalyst and since the maximum amount of chlorine which can be added is related to the surface area, it is desirable that the alumina should have a high surface area for example, more than 250 square metres/gram and preferably more than 300 square metres/gram.

When the catalyst contains a hydrogenating metal, this metal is, as stated above, desirably incorporated with the alumina prior to the chlorination and preferably also prior to the alkali metal or alkaline earth metal treatment. When using a platinum group metal it is also desirable that it should be finely dispersed as small crystallites on the alumina, suitable criteria for the size of crystallites being that they are not detectable by X-ray diffraction or that on treatment of the platinum group metal-alumina composite with benzene at 250° C. they have a measurable benzene chemisorption, preferably not less than 0.1 molecule of benzene adsorbed/atom of platinum and not less than 0.03 molecule of benzene adsorbed/atom of palladium. Details of the benzene chemisorption technique have been published in "Actes du Deuxieme Congres International de Catalyse," Paris, 1960, vol. 2, page 1851.

A convenient method of obtaining the platinum group metal in the required state of sub-division is to add a solution of a platinum group metal compound to a hydrogel of the alumina and to precipitate the platinum group metal as sulphide, for example by treatment with hydrogen sulphide. The treatment of the platinum group metal-alumina composite with the chlorine compound is preferably given with the platinum group metal in a reduced state, and this can conveniently be achieved by pre-treating the composite with hydrogen. When a platinum group metal-alumina composite is treated with a chlorine compound according to the present invention it is believed that a portion of the chlorine taken up is associated with the platinum group metal as an active complex.

Preferably the contacting of the alumina with the chlorine compound is carried out under non-reducing conditions to prevent formation of corrosive hydrogen chloride.

The non-reducing conditions used for the chlorination may be either inert or oxidizing conditions, the latter being preferred. A convenient method of contacting the alumina is to pass a gaseous stream of the chlorine compound over the alumina either alone or, preferably, in a non-reducing carrier gas. Examples of suitable carrier gases are nitrogen, air or oxygen. The vapour may be recycled, desirably until all the chlorine has been used, and in this way an accurate control of the amount of chlorine taken up by the catalyst may be obtained.

When using the preferred chlorinating compounds, non-reducing conditions are essential, since reducing conditions tend to convert the chlorine compound to hydrogen chloride. In addition to the amount of alkali metal or alkaline earth metal present, the temperature, time of contact and amount of chlorine compound used may effect the amount of chlorine taken up by the catalyst, increase of any of these tending to increase the amount taken up. The temperature for the chlorination is preferably from 300–1100° F. (149–593° C.). The tendency to form free aluminum chloride increases with temperatures and care should, therefore, be exercised when using the higher temperatures within the stated range. Since the temperatures used will normally be above the volatilisation temperature of aluminum chloride for formation of free aluminum chloride is readily detected by its appearance in the gaseous reaction products. When treating a platinum group metal-alumina composite, care should also be exercised to prevent the formation of volatile platinum complexes, the tendency for the formation of such complexes again increasing with increasing temperature.

When treating platinum group metal-alumina composites the temperature is preferably 300–700° F. (149–371° C.), platinum-on-alumina composites being more particularly treated at 450–600° F. (232–316° C.) and palladium-on-alumina composites at 500–650° F. (260–343° C.). The chlorination reaction is exothermic and the temperatures specified are the initial temperatures used.

The rate of addition of the chlorine compounds is preferably as low as practicable to ensure uniform chlorination and to avoid a rapid increase of temperature as a result of the exothermic reaction. Preferably the addition rate does not exceed 1.3% wt. of chlorine compound by weight of catalyst per minute. If a carrier gas is used, the rate of flow is preferably at least 200 volumes/volume of catalyst/hour and a convenient range is 200–1000 v./v./hr. The pressure used is conveniently atmospheric.

As stated earlier the active catalyst is susceptible to hydrolysis in the presence of water. If prepared away from its point of use, it should, therefore, be stored under anhydrous conditions but preferably the chlorinating stage is not carried out until the catalyst is in position in a reactor. Similarly the materials used in the catalyst preparaton should also be free from water.

Catalysts prepared by the process of the present invention are particularly suitable for moving the position of the double bond in olefin hydrocarbons. Thus according to another aspect of this invention there is provided a process for the isomerisation of an olefinic hydrocarbon which is capable of undergoing double bond migration which comprises contacting the olefin with a catalyst which has been prepared as hereinbefore described.

Isomerisation in accordance with the present invention may be carried out using as feedstock any olefin capable of double bond migration or a mixture comprising at least one such olefin. Clearly, when employing mixtures, the components will not be present in the equilibrium proportions corresponding to the isomerisation conditions. Double bond isomerisation will usually be effected without producing substantial yields of olefins which has undergone a change of the carbon skeleton.

The olefin may be a mono-olefin, di-olefin or other poly-olefin; however, the preferred feedstocks are mono-olefins. Preferably the olefin has 4–6 carbon atoms/molecule.

The process of this invention is particularly suitable for the conversion to 2-methylpentene-2 of 4-methylpentene-1, and/or 2-methylpentene-1; also, the conversion to 2-methylbutene-2 of 2-methylbutene-1 and/or 3-methylbutene-1; also for the conversion to cis- and trans-pentene-2 of pentene-1.

Preferably isomerisation is carried out at a temperature in the range ambient—300° C. more particularly 100–200° C. at any pressure being sub-atmospheric, atmospheric or super-atmospheric. Usually it will be desirable to maintain vapour phase conditions and the pressure will be selected accordingly. Usually the isomerisation will be carried out in the presence of a carrier gas, suitable nitrogen.

The process for the production of catalysts according to the present invention and the use of the catalyst so prepared according to the invention is illustrated by the following examples:

Example 1

100 ml. portions of a platinum-on-alumina catalyst, containing 0.58 percent weight platinum and 0.81 percent weight chlorine, were first calcined for one hour at 500° C. They were then immersed in solutions of potassium acetate in 200 ml. of deionised water. The solutions contained respectively 12.5, 25 and 50 grams of crystalline potassium acetate. After two hours the catalysts were filtered off and dried overnight at 120° C. before being finally calcined at 500° C. for one hour.

The resulting catalysts had potassium contents of 1.12, 2.30 and 4.25 percent weight respectively.

The BET surface area of the catalyst containing 2.3 percent weight potassium was found to be 348 square metres per gram compared with about 400 square metres per gram for the original platinum catalyst.

In separate experiments, 35 ml. portions of each of the potassium containing catalysts, and also of the original platinum catalyst, were placed in a vertical reactor maintained at 300° C. and purged with dry nitrogen for 15 minutes. Dry carbon tetrachloride (7 ml.) was then added dropwise to the heated catalyst over a period of 15 minutes while the nitrogen flushing continued. The catalyst was finally purged with dry nitrogen for a further 15 minutes before being stored in a dry container.

Chlorine analytical data given below indicates that the presence of the alkali metal, in this case potassium, suppresses chlorination to a limiting value of about 6.0 percent weight compared with about 12 percent weight for the original catalyst.

| Catalyst | Potassium content of catalyst to be chlorinated, percent weight | Final chlorine content, percent weight |
|---|---|---|
| I | Nil | 12.8 |
| II | 1.12 | 7.5 |
| III | 2.30 | 6.3 |
| IV | 4.25 | 6.3 |

Additional analytical data on the chlorinated catalysts gives carbon contents of 0.02–0.03 percent weight, indicating that no significant carbon laydown had accompanied the alkali impregnation or chlorination procedures.

The chlorinated catalysts produced above, that is, Catalysts I, II, III and IV, were used to isomerise 4-methylpentene-1 at atmospheric pressure, mid bed temperature 162±2° C. using an olefin liquid hourly space velocity of 1.0 v./v./hr.

| Catalyst | 2-methylpentene-2 in product, percent weight | | Comments |
|---|---|---|---|
| | Hours on stream | | |
| | 1 | 2 | |
| I | 22.5 | 17.2 | Rapid deactivation due to polymerisation of olefin. |
| II | 31.0 | 24.8 | Not selective; some 3-methylpentene-2 produced. |
| III | 62.0 | [1] 62.0 | Completely selective. |
| IV | 48.7 | 48.8 | Do. |

[1] Still 62 percent after 4 hours on stream.

The potassium containing catalysts when used without treatment with carbon tetrachloride were inactive under the test conditions used above.

Example 2

A similar series of sodium containing catalysts were prepared by the technique described in Example 1 except that 100 ml. samples of the platinum-on-alumina catalyst were treated with 200 ml. of solutions containing respectively 12.5, 25 and 50 grams of crystalline sodium acetate.

The chlorination procedure was as in Example 1:

| Catalyst | Sodium content of catalyst to be chlorination, percent weight | Final chlorine content, percent weight |
|---|---|---|
| I | Nil | 12.8 |
| V | 0.44 | ([1]) |
| VI | 1.07 | 8.8 |
| VII | 1.70 | 8.9 |

[1] Not determined.

Again, a limiting degree of chlorination was obtained with increasing alkali metal content.

These chlorinated sodium containing catalysts were used to isomerise 4-methylpentene-1 under the conditions described in Example 1.

Again, improvements in activity and selectivity were noticed compared with the chlorinated catalyst containing no alkali metal, although the degree of improvement was not as marked as for the potassium containing catalysts.

*Example 3*

This example describes the use of an alumina only, the alumina being the material used as the basis of the platinum-alumina catalyst used in Examples 1 and 2.

85 ml. of this alumina were calcined for one hour at 500° C. and then plunged into 170 ml. of a solution of 21 grams of crystalline potassium acetate. After two hours the catalyst was filtered off and dried overnight at 120° C. before being calcined at 500° C. for one hour. On analysis the potassium content was 1.8 percent weight and the carbon content 0.02 percent weight.

35 ml. of this catalyst was chlorinated with carbon tetrachloride in the manner described in Example 1. The chlorine content of the resulting material was 6.7 percent weight.

This chlorinated catalyst was then used to isomerise 4-methylpentene-1 under conditions essentially those used in Examples 1 and 2 viz, atmospheric pressure, temperature 164±2° C. and an olefin liquid hourly space velocity of 1.0 vol./vol./hour.

The results obtained are given below:

| HOS | 2-methyl-pentene-2, percent weight | 2-methyl-pentene-1, percent weight |
|---|---|---|
| ¾–1 | 1.93 | 8.2 |
| 1 –1¼ | 18.7 | 6.4 |
| 1¼–1½ | 18.3 | 6.6 |
| 1½–1¾ | 18.3 | 6.2 |

No products arising from skeletal isomerisation were detected, again emphasising the selectivity of the alkali metal containing catalysts.

This performance is to be compared with that of, on the one hand, a non-chlorinated potassium containing alumina which was inactive, and on the other hand, that of a chlorinated alumina which although initially active rapidly became deactivated due to olefin polymerisation.

I claim:

1. A method of preparing a catalyst suitable for hydrocarbon conversion reactions comprising the step of contacting a halogenatable inorganic oxide with a compound selected from the group consisting of compounds of alkali metals and alkaline earth metals so that said compound selected from the group consisting of compounds of alkali metals and alkaline earth metals is retained by said oxide in amount from at least 1% to 10% by weight of said inorganic oxide and contacting said oxide with a chlorine containing compound of general formula

where X and Y are selected from the group consisting of H, Cl, Br, F and SCl, said chlorine containing compound being used under non-reducing conditions and at a temperature in the range 149° C.–593° C. such that chlorine is taken up by said oxide in amount such that the weight of chlorine retained is from 1.0 to 15% by weight of total catalyst, without the production of free chloride.

2. A method as claimed in claim 1 wherein the catalyst contains from 0.1 to 5% by weight of a substance having hydrogenating activity selected from the group consisting of metals of and metal compounds of Group VIII of the Periodic Table according to Mendeléeff, said substance being added prior to chlorination.

3. A method as claimed in claim 2 wherein said substance having hydrogenating activity is added prior to the addition of said compound selected from the group consisting of compounds of alkali metals and alkaline earth metals.

4. A method as claimed in claim 1 where said chlorine-containing compound is carbon tetrachloride.

5. A method as claimed in claim 1 wherein said inorganic oxide is alumina.

6. A method as claimed in claim 1 wherein said inorganic oxide is alumina used in admixture with at least one other inorganic oxide.

7. A method as claimed in claim 1 wherein the alkali metal and alkaline earth metal containing compounds are compounds of alkali metals and alkaline earth metals selected from the group consisting of carbonates, bicarbonates and salts of organic acids.

8. A method as claimed in claim 1 wherein said inorganic oxide is contacted with said compound selected from the group consisting of compounds of alkali metals and alkaline earth metals and thereafter with said chlorine-containing compound.

9. A method of preparing a catalyst suitable for hydrocarbon conversion reactions comprising the step of contacting a halogenatable inorganic oxide with a compound selected from the group consisting of compounds of alkali metals and alkaline earth metals so that said compound selected from the group consisting of compounds of alkali metals and alkaline earth metals is retained by said oxide in amount from at least 1% to 10% by weight of said inorganic oxide and contacting said oxide with a chlorine containing compound of general formula

wherein X and Y together form a divalent radical selected from the group consisting of O and S, said chlorine containing compound being used under non-reducing conditions and at a temperature in the range 149° C.–593° C. such that chlorine is taken up by said oxide in amount such that the weight of chlorine retained is from 1.0 to 15% by weight of total catalyst, without the production of free chloride.

10. A process for the isomerisation of an olefinic hydrocarbon which is capable of undergoing double bond migration which comprises contacting said olefinic hydrocarbon with a catalyst as claimed in claim 1 at a temperature in the range 0° C.–300° C.

11. A process as claimed in claim 10 in which the olefinic hydrocarbon is 4-methylpentene-1.

12. A process as claimed in claim 10 in which isomerisation is effected at a temperature in the range 100° C.–200° C.

13. A process for the isomerisation of an olefinic hydrocarbon which is capable of undergoing double bond migration which comprises contacting said olefinic hydrocarbon with a catalyst as claimed in claim 9 at a temperature in the range 0° C.–300° C.

References Cited by the Examiner

UNITED STATES PATENTS

| | | | |
|---|---|---|---|
| 2,479,110 | 8/1949 | Haensel | 208—139 |
| 2,602,772 | 7/1952 | Haensel | 208—139 |
| 2,642,384 | 6/1953 | Cox | 208—139 |
| 2,924,629 | 2/1960 | Donaldson | 260—683.2 |

ALPHONSO D. SULLIVAN, *Primary Examiner.*